United States Patent [19]

Margetts

[11] Patent Number: 4,809,822
[45] Date of Patent: Mar. 7, 1989

[54] DISC BRAKES

[75] Inventor: Hugh G. Margetts, Ross-on-Wye, England

[73] Assignee: Lucas Industries public limited company, Birmingham, England

[21] Appl. No.: 98,150

[22] Filed: Sep. 18, 1987

[30] Foreign Application Priority Data

Sep. 19, 1986 [GB] United Kingdom ............... 8622617

[51] Int. Cl.$^4$ ............................................. F16D 55/08
[52] U.S. Cl. ................................. 188/72.7; 188/71.4; 188/106 F
[58] Field of Search ................... 188/72.6, 72.7, 72.8, 188/72.9, 106 F, 71.4

[56] References Cited

U.S. PATENT DOCUMENTS 4,036,329  7/1977  Anderson .................. 188/72.7
4,522,286  6/1985  Villata et al. .............. 188/72.7
4,635,761  1/1987  Smith et al. ............... 188/72.7

FOREIGN PATENT DOCUMENTS 0265327  2/1965  Australia .................... 188/72.7
2233888  1/1975  France ....................... 188/72.7
0668710  3/1952  United Kingdom ....... 188/72.7
1179890  2/1970  United Kingdom ....... 188/72.6

Primary Examiner—Andres Kashnikow
Assistant Examiner—Matthew C. Graham
Attorney, Agent, or Firm—Scrivener and Clarke

[57] ABSTRACT

The present invention relates to disc brakes suitable for use on commercial vehicles, the disc brake incorporating a parking brake facility in addition to a service brake facility. The disc brake of the present invention comprises a housing within which a brake actuator is arranged, the parking brake facility being operable by a lever connected to a cam member which is eccentrically supported on a pivot pin carried by the housing. The cam member is arranged to act on the brake actuator arrangement as the lever is moved, the lever projecting laterally of the cam member, near to the axial mid region of the cam member.

8 Claims, 2 Drawing Sheets

DISC BRAKES

DESCRIPTION

The present invention relates to disc brakes for vehicles.

In particular the present invention relates to a disc brake suitable for use on commercial vehicles, the disc brake incorporating a parking brake facility in addition to a service brake facility. In one such disc brake the parking brake facility is operable by moving a lever which is keyed to one end region of an elongate camshaft which is rotatably supported in the brake housing. The camshaft is cylindrical with a reduced diameter section eccentrically turned between its respective end regions; the respective end regions of the camshaft being supported in the brake housing together with suitable bearings, seals, circlips, etc. A thrust piece or "dolly" is located between the camshaft and an adjuster in the housing, the thrust piece having a part-cylindrical recess formed in one end region, which recess engages the eccentric reduced diameter section of the camshaft. The opposite end region of the thrust piece is generally part-spherically shaped and engages the adjuster. Thus, as the lever is moved to apply the parking brake the camshaft is rotated causing the eccentric reduced diameter section to rotate in the said part-cylindrical recess of the thrust piece, a part-cylindrical bearing secured in said recess providing for smooth action. The thrust piece thus acts on the adjuster to apply the parking brake.

Although the above-described construction is efficient in operation, there are several inherent disadvantages with this known construction:

(1) It is very expensive to manufacture. For example, the end regions of the camshaft and the eccentric reduced diameter region, have to be accurately machined.

Further, flats have a to be milled on one end region of the camshaft to provide for keying the lever to the camshaft. Also the thrust piece has to be accurately formed with the said part-spherical end region and part-cylindrical recess. Still further the part-cylindrical bearing has to be specially made with special tags which engage in milled slots in the thrust piece to prevent the bearing from moving axially; the bearing being glued in position to facilitate assembly.

(2) As the lever is mounted at one end of the camshaft, and is thus offset from the central axis of the actuator, the bearings tend to be unevenly loaded when the lever is actuated—this can lead to premature wear.

(3) The assembly and servicing of the parking brake facility is difficult. To explain, the camshaft has to be located in position before the thrust piece, and only then can the adjuster components be installed. Further, there is no guarantee that during assembly the thrust piece is correctly seated on the eccentric section of the camshaft, through the part-cylindrical bearing is glued to the thrust piece to try to prevent its mis-location during assembly.

The aim of the present invention is to provide a disc brake incorporating a lever mechanism which is relatively cheap to manufacture and which obviates or least reduces the effects of the above disadvantages.

According to the present invention there is provided a disc brake for a vehicle, comprising a housing within which a brake actuator is arranged, a lever being connected to a cam member which is eccentrically supported on a pivot pin carried by the housing, the cam member being arranged to act on the brake actuator arrangement as the lever is moved.

In one embodiment of the present invention the cam member is cylindrical with a bore extending through the cam member parallel to the central axis of the cylindrical cam member but offset therefrom. The pivot pin extends through the bore with a cylindrical bearing liner located between the pivot pin and the wall of the bore, the end regions of the pivot pin projecting from opposite ends of the bore and being respectively non-rotatably secured to two projecting arms of the caliper housing. The lever is preferably integrally formed with the cam member, so as to project laterally of the cylindrical cam member level with the axial mid-region of the cylindrical cam member. In this way the bearing between the cam member and pivot pin is substantially evenly loaded along its length during operation.

A roller is preferably freely rotatably mounted on the periphery of the cylindrical cam member, the roller engaging an intermediate member which in turn engages an adjuster mechanism connected to the actuator. Thus, by moving the lever the cylindrical cam member moves eccentrically about the pivot pin causing the roller to apply actuation pressure on the brake actuator. Friction between the intermediate member and the roller may thus impede rotation of the roller, but will not impede rotation of the cam member relative to the roller i.e. the friction will not impede operation of the parking brake. Preferably a cylindrical bearing is provided between the roller and the cylindrical cam member to enhance smooth operation, and the whole cam member/roller/intermediate member arrangement is preferably protected against dirt and moisture by a suitable flexible boot.

In an alternative embodiment of the present invention the sole difference from the above-described embodiment lies in the fact that the pivot pin is both supported in bearings in the caliper housing and fixedly secured or integrally formed with the cylindrical cam member. Alternatively, if desired, the pivot pin may be rotatably supported in the caliper housing and the cam member may be rotatable on the pivot pin.

The disc brake of the present invention may be actuated by any desired means. For example, it may be hydraulically actuated for service brake operation with the lever providing a mechanical park facility, or the lever itself may be operated by any suitable means, e.g. hydraulic, pneumatic or mechanical, to provide an actuation mechanism in a non-hydraulic actuator.

The construction of the present invention is easier and cheaper to manufacture and service as compared with the prior art construction previously described and due to the more even loading of the bearings, the construction of the present invention should have a longer useful life.

The present invention will now be further described, by way of example, with reference to the accompanying drawings, in which.

Figure 1:
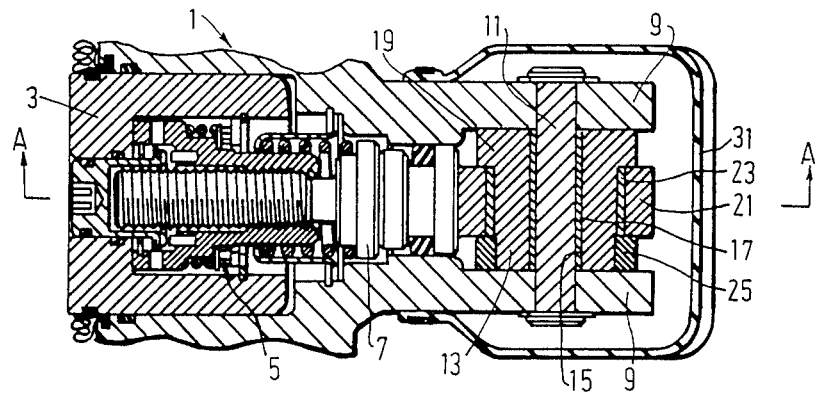
FIG. 1 is a sectional plan view of part of one embodiment of a caliper constructed according to the present invention, taken along line B—B in FIG. 2.
Figure 2:
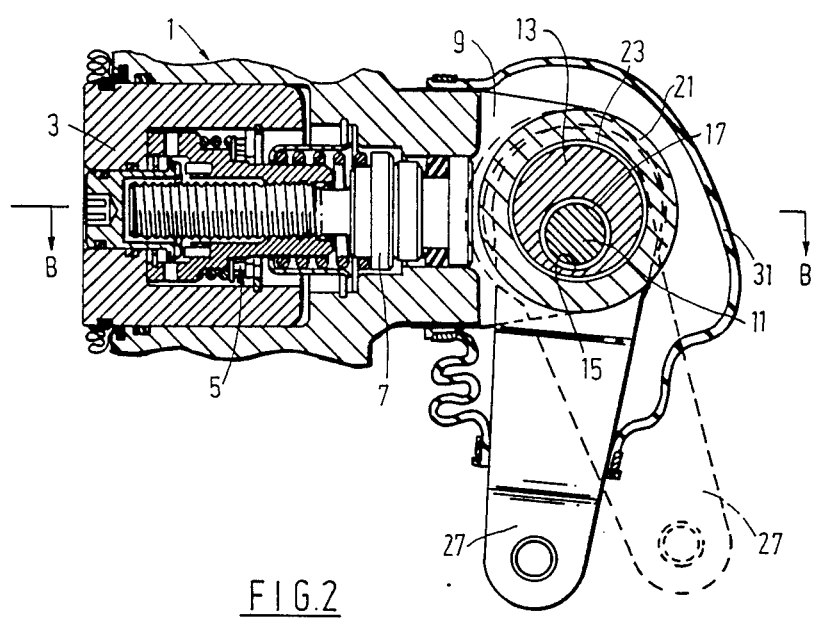
FIG. 2 is a sectional side view of the part of the embodiment shown in FIG. 1, taken along line A—A.

The embodiment of the present invention illustrated in FIGS. 1 and 2 of the accompanying drawings comprises a caliper housing 1 within which a brake actuator 3 is axially slidably located, the actuator 3 being connected by an adjuster mechanism 5 to an elongate intermediate member 7.

The caliper housing 1 has two generally parallel arms 9 between which a pivot pin 11 extends, the pivot pin 11 being non-rotatably secured to each of said arms 9. Rotatably mounted on the pivot pin 11 is a cylindrical cam member 13, the pivot pin 11 extending through a bore 15 in the cam member 13. The bore 15 extends parallel to the central axis of the cylindrical cam member but is offset therefrom (FIG. 2) so that the cam member 13 is eccentrically rotatable on the pivot pin 11. To provide for smooth rotation especially under load, a cylindrical bearing liner 17 is located between the pivot pin 11 and the wall of the bore 15.

As best seen in FIG. 1 of the accompanying drawings the cylindrical cam member 13 has an enlarged diameter region 19 at one axial end, with an annular roller 21 rotatably mounted on the cylindrical periphery of the cam member 13 adjacent to the enlarged diameter end region 19. A cylindrical bearing 23 located between the roller 21 and the periphery of the cam member 13 allows free and easy rotation between the roller 21 and the cam member 13, even under load. To retain the roller 21 in position on the cam member 13, an annular ring 25 is an interference fit on the other axial end of the cylindrical cam member 13.

Integrally formed with the cam member 13 is an operating lever 27, pivotal movement of the operating lever 27 causing the cylindrical cam member 13 to rotate eccentrically amount the pivot pin 11. In this way, the roller 21 applies axial pressure to the intermediate member 7 and thus operates the brake actuator 3 to apply the parking brake facility of the caliper. Friction between the roller 21 and intermediate member 7 does not impede smooth and easy application of the parking brake facility, as the roller 21 is free to rotate on cylindrical bearing 23 on cam member 13. In an alternative embodiment (not illustrated) however, the roller 21 can be omitted, the cam member 13 engaging the intermediate member 7 directly. Further, the operating lever 27 projects laterally of the cylindrical cam member 13 from the enlarged diameter end region 19 of the cam member 13 and is thus immediately adjacent to the annular roller 21. In this way the load reacted through the roller 21 does not have a large moment of force with the operating lever 27, so that the various bearings are substantially evenly loaded. The useful life of the construction is thus enhanced.

Figure 3:
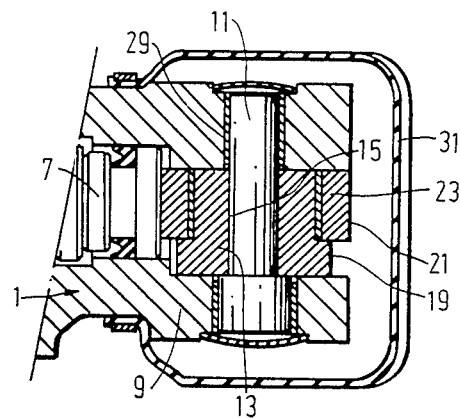
FIG. 3 is a plan view of part of another embodiment of the present invention.
Figure 4:
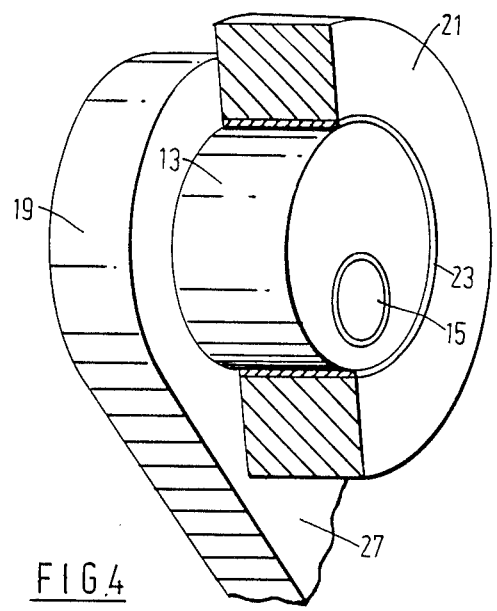
FIG. 4 is a cutaway view of part of the embodiment of FIG. 3.

In another embodiment of the present invention illustrated in FIGS. 3 and 4 of the accompanying drawings, components equivalent to components of the embodiment of FIGS. 1 and 2, are identified by like reference numerals. The main difference between the embodiment of FIGS. 1 and 2, and the embodiment of FIGS. 3 and 4, is that in the embodiment of FIGS. 3 and 4, the pivot pin 11 is rotatably supported in the caliper housing 1 on bearings 29, with the cam member 13 non-rotatably secured to the pivot pin 11. The cam member is of generally cylindrical configuration with an enlarged diameter end region 19 and an axially extending bore 15 which is located eccentrically of the generally cylindrical cam member, the pivot pin 11 being an interference fit in the bore 15. An annular roller 21 is mounted on a bearing provided on the outer periphery of the cam member 13 and is retained thereon by both the adjacent enlarged diameter end region 19 of the cam member, and an arm 9 of the caliper housing 1. The annular roller 21 engages an intermediate member 7 which connects with the brake actuator (not shown). Integrally connected with the enlarged diameter end region 19 is an operating lever 27 (see FIG. 4), rotation of the lever 27 causing the cam member 13 and pivot pin 11 to rotate in bearings 29 so that due to the eccentric mounting of the cam member 13, the roller 21 exerts pressure on the intermediate member 7 resulting in the application of the parking brake facility. Friction between the roller 21 and intermediate member 7 does not impede operation of the lever 27 as the cam member 13 rotates within the roller 21 if in fact the relevant forces are sufficient to prevent the roller from sliding over the intermediate member 7.

In any of the above-described constructions, the brake actuator can be hydraulically, pneumatically or mechanically applied in the service brake mode. Further, the operating lever 27 can be used for the parking brake facility or the service brake facility in a non-hydraulic actuator, and can be applied by any suitable means e.g. by mechnical, hydraulic and/or pneumatic pressure. To protect the lever mechanisms in any of the above-described constructions, a flexible boot 31 is provided.

By virtue of the construction of the present invention, the brake housing casting can be simplified and this can result in a weight reduction, it also being possible that it could lead to a reduction in overall length. Further, assembly and servicing of the lever mechanism is easier than in prior art arrangements of this type. Additionally, the whole brake is considerably cheaper to manufacture than prior art constructions of this type, there being no special bearings, no milling of flats or machining of recesses and part-spherical regions etc. Further, there are fewer parts i.e. there are no "O"-rings, nuts, bolts etc. Also, there is a reduced moment on the bearings used, as compared to prior art constructions of this type, and thus the loading of the bearings and the subsequent wear is reduced.

The present invention thus provides a disc brake with a simplified lever mechanism.

We claim:

1. A disc brake for a vehicle, comprising a housing within which a brake actuator is arranged, a cylindrical cam member having a bore extending therethrough parallel to the central axis of said cam member but offset therefrom, a pivot pin extending through said bore to provide an eccentric support for said cam member, an annular roller rotatably mounted on the cylindrical periphery of said cam member, and a lever connected to said cam member, the cam member being arranged to act on the brake actuator as the lever is moved.

2. A disc brake according to claim 1, wherein a bearing liner is located between the pivot pin and the wall of the bore.

3. A disc brake according to claim 1, wherein opposite end regions of the pivot pin project from opposite ends of the bore and are respectively nonrotatably secured to two projecting arms of the housing.

4. A disc brake according to claim 3, wherein the pivot pin is rotatably supported in the bearings in two projecting arms of the housing, and fixedly secured to said cam member.

5. A disc brake according to claim 1, wherein a bearing is provided between the roller and the cam member.

6. A disc brake according to claim 1, where the cylindrical cam member has an enlarged diameter region at one axial end, with the annular roller rotatably mounted on the cam member adjacent to the enlarged diameter region, an annular ring being secured on the other axial end region of the cylindrical cam member to retain the roller in position.

7. A disc brake according to claim 6, wherein the lever is integrally formed with the enlarged diameter region of said cam member, the lever projecting laterally of the cam member.

8. A disc brake according to claim 1, wherein the roller engages an intermediate member which in turn engages an adjuster mechanism connected to the actuator.

* * * * *